June 20, 1961 E. R. HERSMAN 2,989,209
PRESSURE SEALING JOINT AND GASKET THEREFOR
Filed Sept. 13, 1956 2 Sheets-Sheet 1

INVENTOR.
Edward R. Hersman
BY
*J.P.Moran*
ATTORNEY

June 20, 1961     E. R. HERSMAN     2,989,209
PRESSURE SEALING JOINT AND GASKET THEREFOR
Filed Sept. 13, 1956     2 Sheets-Sheet 2

INVENTOR
Edward R. Hersman
BY
ATTORNEY

United States Patent Office 2,989,209
Patented June 20, 1961

2,989,209
PRESSURE SEALING JOINT AND GASKET THEREFOR
Edward R. Hersman, Wadsworth, Ohio, assignor to The Babcock & Wilcox Company, New York, N.Y., a corporation of New Jersey
Filed Sept. 13, 1956, Ser. No. 609,706
3 Claims. (Cl. 220—46)

This invention relates to a high pressure vessel and more particularly to an improved pressure seal for use in such vessels.

In utilizing a high pressure vessel, such as a separator, autoclave or the like consisting of a body having an open end and a closure therefor, it is particularly important that the sealing joint between the body and closure therefor be made absolutely tight so as to prevent leakage at maximum operating pressures. Heretofore, it was customary in making such a seal to employ a deformable, wedge type gasket, usually formed in a ductile material such as copper, aluminum or the like between the body and closure. Thus when pressure was applied, the gasket was subjected to a wedging action and deformed to form the seal therebetween. However, the disadvantage in seals of this type was that whenever the joint was required to be broken, the deformed gasket would be frozen or seized to its seat so that it was necessary to hammer, chisel or otherwise pry it loose. As a result the gasket could not be reused. As it oftentimes happened as a result thereof, the surfaces of the vessel and closure mating on said gasket became pitted, burred or otherwise damaged. Consequently use of the prior known seal constructions for pressure vessels which required the seal thereof to be frequently broken required a considerable expense. Further, it has been discovered that because the gaskets of prior known constructions were subjected to a mere wedging moment a relatively large amount of bolting area was required to pre-seal the vessel.

An object of this invention is to provide in a high pressure vessel an improved pressure joint capable of withstanding relatively high pressures and which can be readily broken without resulting injury to the mating surfaces of said joint.

Another object of this invention is to provide for an improved sealing gasket having a high proportional elastic limit and constructed so as to be subjected to a turning or twisting movement when a relatively high pressure is applied thereto so that upon release of said pressure the gasket will, as a result of its internal torsional energy assume its original position.

Still another object of this invention is to provide an improved gasket construction which will require a minimum of bolting area to form a pre-seal when used in a high pressure vessel having a bolted or Bridgeman type closure.

The above objects and advantages are accomplished according to this invention by an improved gasket construction having a relatively high proportional elastic limit which when utilized in a pressure vessel as a seal is subjected to twisting or turning moment as pressure is applied thereto. Consequently, upon release of said pressure, the inherent torsional energy returns the gasket to its original unstressed position. Thus freezing of the gasket to its seat is prevented.

This is accomplished by a gasket having a polygonal cross-sectional area having a top surface and a depending cylindrical surface and a depending surface inclined relative thereto forming a toe portion therebetween, the inclined surface forming a conical seating surface for the gasket. In its unstressed position the incline or seat forming surface and top contact surface of the gasket are positioned to form an inclined angle with respect to the adjacent mating surface of a pressure vessel. Thus when a force is applied, the end force component acting on the top surfaces imparts a turning or twisting moment to the gasket causing the toe portion thereof to establish a line contact seal with respect to the wall of the vessel so that the greater the pressure applied the tighter the seal becomes.

A feature resides in the provision whereby the improved joint construction of this invention enables the same to be readily broken without injury to the mating surfaces thereof.

Another feature of this invention resides in the provision whereby freezing of the sealing gasket to its seat is prevented.

Still another feature of this invention resides in the provision that the improved structure is relatively simple, inexpensive and positive in operation.

Other features and advantages will be apparent when considered with respect to the drawings and accompanying description in which.

Figure 1:
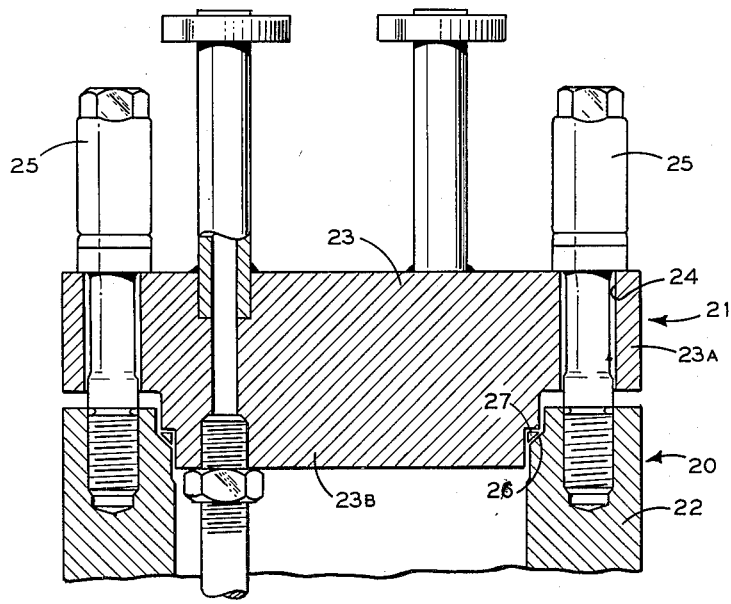
FIG. 1 is a section view of a pressure vessel having portions thereof broken away utilizing the improved sealing joint of the instant invention.
Figure 2:
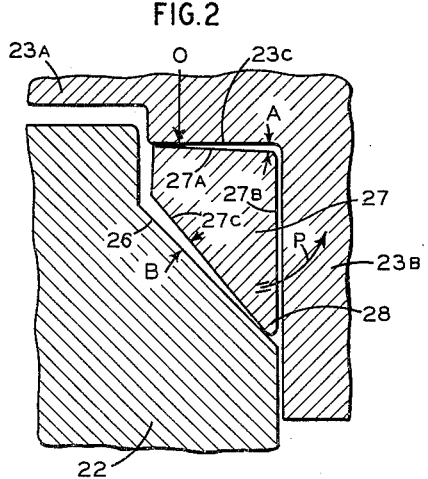
FIG. 2 is an enlarged detail view illustrating the position of the elements of the joint in unstress position.
Figure 3:
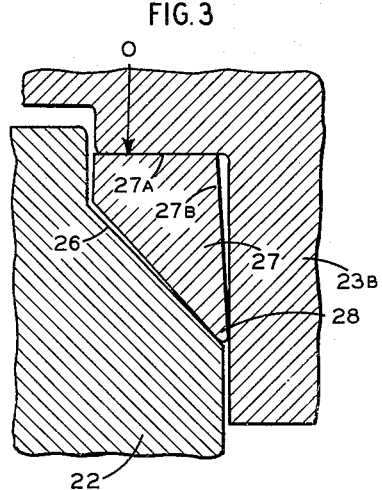
FIG. 3 is an enlarged detail view similar to that of FIG. 2, but illustrating the parts in stressed position.

Referring to FIGS. 1 to 3, the improved sealing joint and gasket construction for accomplishing the same is herein illustrated in conjunction with a pressure vessel 20 having a bolted flanged closure 21 therefore. As shown the pressure vessel 20 is of the type generally utilized as a separator, autoclave, heat exchanger or the like consisting of a relatively thick wall body 22 closed at one end (not shown) and opened at the other, the open end being adapted to receive the removable closure 21. The latter consists of a cover 23 having a flange portion 23A provided with circumferentially spaced opening 24 for receiving bolt means 25 by which it can be removably fastened to the body 22 of the vessel; the cover 23 being provided with a projecting portion 23b which extends into the opening or mouth of the vessel. As shown the diameter of the projecting portion 23b of the cover is made slightly smaller than the internal diameter of the vessel.

As the vessel described is adapted to contain a fluid at relatively high pressure, it is particularly important that a leak proof seal or joint be made between the open end and cover therefor to insure against leakage, which in certain processes would result in serious consequences. Heretofore, the seal or joint for such vessels was formed by disposing a gasket formed of a ductile material between the flange cover and body of the vessel so that a sealing pressure applied thereto by a turning of the bolts cause the gasket to be deformed as it was wedged between the cover and adjacent wall portion of the vessel to form the seal. As a result the ductile, deformable gasket tended to freeze or become seized in its seat and whenever it was necessary to break the joint, the gasket had to be forceably pryed loose by hammer or chisel. Because of this the co-operating or mating surfaces of the vessel and cover would oftentimes become pitted, burred, chipped or otherwise damaged. Consequently to form a subsequent seal, the mating surfaces of the vessel generally required a resurfacing or refinishing operation and a new gasket in order to insure the proper seal therebetween. As a result each breaking of the seal constitutes a definite fixed cost. For vessel which required the seal to be frequently broken, this cost constituted a significant sum.

In order to overcome the above disadvantages, an improved gasket construction is provided which co-operates with the adjacent mating surfaces of the cover and body portion of a vessel so as to prevent freezing of the gasket to its seat when the seal is broken. As a result the pitting or marring of the mating surfaces of the joint caused by hammering or prying the gasket loose is eliminated. Also the gasket construction according to this invention is such that it remains undamaged and therefore is rendered reusable.

Referring to FIG. 1, the inner wall surface of the body 22 adjacent its open end is provided with an inclined shoulder portion 26 which forms a conical seat for receiving the gasket construction of the instant invention. As shown in FIGS. 1 to 3, the construction of the gasket 27 consists of an annular member having a substantially triangular or polygonal cross-sectional area. According to this invention the gasket 27 is constructed of a material having a high proportional elastic limit. The gasket 27 is provided with a top contact surface 27A having depending inner and outer surfaces, one of which is inclined relative to the other to form a toe portion therebetween. In the gasket construction illustrated in FIGS. 1 to 3 the inner surface 27B is cylindrical and the outer surface 27C is inclined relative thereto to form the toe portion 28.

According to this invention when the gasket 27 is disposed within the mouth of the vessel in an unstressed or normal position, the shoulder 26 forming the conical seat, the under surface or shoulder 23C of the flange and the surfaces 27A, 27B, and 27C are positioned so that an included angle A is formed between the under surface 23C of the flange and surface 27A of the gasket and an included angle B is formed between the incline surface 27C and the shoulder 26; the included angle B being equal to or greater than angle A. Thus, it will be noted that with the gasket disposed on its seat 26 between the vessel and cover, FIG. 2, the application of pressure by a uniform turning of the bolts 25 to draw the vessel and cover into sealing position as shown in FIG. 3 causes the toe 28 of the gasket 27 to wedge between the projecting portion 23B and the wall of the vessel to form a line contact seal while the end force component as indicated at O subjects the gasket 27 to a twisting or turning movement in the direction indicated by arrow P, the turning movement being such as to not exceed the elastic limit of the gasket material. It is to be noted the angles A and B provide the necessary clearance for accomplishing the twisting moment. Thus as long as pressure is maintained as indicated in FIG. 3 an effective line contact seal is had between the cover and the body of the vessel.

Because the gasket 27 is not stressed beyond its elastic limit when pressure is applied thereto, it will be noted that when the seal is broken and the pressure is relieved, the inherent torsional energy of the gasket 27 causes it to automatically spring or loosen itself from the seat portion 26 to assume its normal or original unstressed position as indicated in FIG. 2. Thus the seal is rendered self breaking and the need of prying the gasket from its seat is eliminated.

As shown in FIGS. 2 and 3, angle A is formed by making the angle included between surfaces 27A and 27B slightly greater than 90°. It has been discovered that an angle A of 1°30' is satisfactory to accomplish the desired results.

Figure 4:
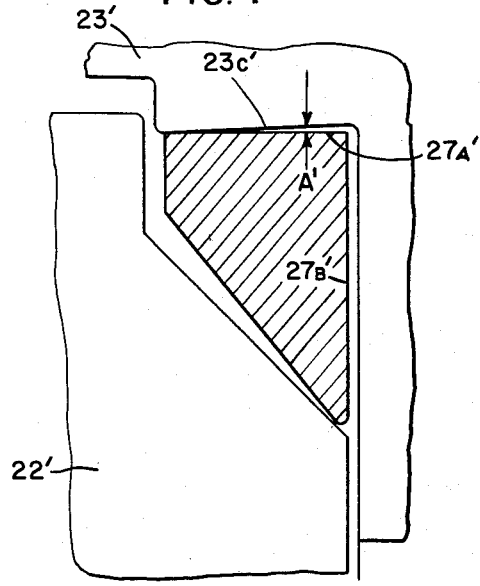
FIG. 4 is an enlarged detail view of a modified form of the invention illustrating the unstress position thereof.
Figure 5:
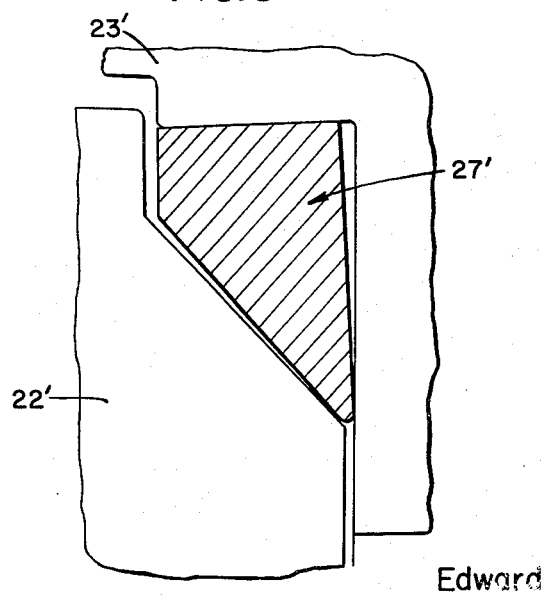
FIG. 5 is an enlarged detail of the form illustrated in FIG. 4 illustrating the stressed position thereof.

FIGS. 4 and 5 are illustrative of a modified form of the invention. This form of the invention 22' and 23' are similar to the corresponding elements shown in FIGS. 1 to 3 except that angle A' is formed by machining an undercut on surface 23C' of the flange 23' to form the included angle A' with respect to top surface 27A' of the gasket, thus rendering the angle formed between surfaces 27A' and 27B' equal to 90°. If desired, angle A' may be formed by machining portions of both surfaces 23C' and 27A' to form the included A'. In all other respects, this form of the invention is similar in operation to the form illustrated and described with reference to FIGS. 1 to 3; FIG. 4 showing the unstressed position of the parts and FIG. 5 illustrating the stressed position of gasket construction.

From the foregoing it will be noted that the improved seal or joint utilizes a novel gasket construction formed of a suitable material having a high proportioned elastic limit and is peculiarly shaped and arranged as shown and described to co-operate with the adjacent mating surfaces of a pressure vessel and closure therefor so that the inherent torsional energy stored within the gasket under stress is utilized to automatically prevent freezing or seizing of the gasket to its seat upon breaking of the joint or seal. Furthermore, it will be noted that the gasket is not deformed while under stress and consequently is rendered readily reusable after the initial seal has been broken. This feature is particularly important for pressure seals which are required to be frequently broken. Consequently, a new gasket is not required each time the cover is required to be removed. Further freedom from seizure or freezing reduces to a minimum the resurfacing or refinishing of the mating surfaces of the joint.

While the instant invention has been disclosed with reference to several specific embodiments thereof, it is to be appreciated that the invention is not to be taken as limited to all of the details thereof, as modifications and variations thereof may be made without departing from the spirit or scope of the invention.

What is claimed is:

1. A pressure vessel comprising a body having on open end provided with a conical seat portion, a closure in register with said open end, said closure having a flange portion and a projecting portion, said projecting portion being adapted to extend into said body, means arranged to exert a force on said closure to move it into sealing position with respect to said body, and an annular sealing gasket having a polygonal cross-section area seated between said closure projecting portion and the body of said vessel, said gasket having a top contact surface and depending inner and outer surfaces, said inner surface being cylindrical and said outer surface being inclined relative to said cylindrical surface, said outer inclined surface forming a conical gasket seating surface which is arranged to seat on said conical seat portion of said body so that in the unstressed position the inclined surface of said gasket and conical seat portion of said body form therebetween an included upwardly opening angle and said top contacting surface of said gasket and the adjacent flange portion of said closure form an included angle opening toward the cylindrical surface of said gasket so that when a force is applied the annular gasket is subjected to a wedging and twisting moment to establish a fluid tight seal and upon release of said force the inherent torsional energy of said gasket returns the same to its original position.

2. The invention as defined in claim 1 wherein said top contact surfaces with respect to said inner cylindrical surface forms an angle greater than 90°.

3. The invention as defined in claim 1 wherein said top contact surface forms a right angle with respect to said cylindrical surface of said gasket.

References Cited in the file of this patent

UNITED STATES PATENTS

| | | |
|---|---|---|
| 1,825,962 | Laird | Oct. 6, 1931 |
| 2,226,494 | Jacocks | Apr. 7, 1942 |
| 2,278,881 | Jacocks | Apr. 7, 1942 |
| 2,665,877 | MacGregor | Jan. 12, 1954 |
| 2,744,651 | Bredtschneider | May 8, 1956 |
| 2,783,912 | Hobbs | Mar. 5, 1957 |